United States Patent
Gearing

[11] Patent Number: 5,766,293
[45] Date of Patent: Jun. 16, 1998

[54] METHOD AND APPARATUS FOR MAKING OPTICAL PREFORMS WITH CONTROLLED PERIPHERAL EDGE WALL GEOMETRY

[75] Inventor: Daniel R. Gearing, Rochester, N.Y.

[73] Assignee: Eastman Kodak Company, Rochester, N.Y.

[21] Appl. No.: 725,382

[22] Filed: Oct. 3, 1996

[51] Int. Cl.$^6$ .............................. C03B 11/08; C03B 11/12
[52] U.S. Cl. ...................... 65/68; 65/66; 65/72; 65/226; 65/319
[58] Field of Search ..................... 65/66, 68, 222, 65/223, 226, 308, 319, 321, 72

[56] References Cited

U.S. PATENT DOCUMENTS

| | | | |
|---|---|---|---|
| 3,244,497 | 4/1966 | Copeland | 65/308 |
| 3,271,126 | 9/1966 | Jenkins | 65/160 |
| 3,293,017 | 12/1966 | Jenkins | 65/72 |
| 3,833,347 | 9/1974 | Angle et al. | 65/32 |
| 4,012,215 | 3/1977 | Schwab et al. | 65/66 |
| 4,139,677 | 2/1979 | Blair et al. | 428/409 |
| 4,168,961 | 9/1979 | Blair | 65/66 |
| 4,554,001 | 11/1985 | Shields et al. | 65/160 |
| 4,591,373 | 5/1986 | Sato | 65/29 |
| 4,629,489 | 12/1986 | Hirota et al. | 65/102 |
| 4,696,692 | 9/1987 | Schmitt | 65/102 |
| 4,734,118 | 3/1988 | Marechal et al. | 65/102 |
| 4,756,737 | 7/1988 | Yoshimura et al. | 65/275 |
| 4,836,838 | 6/1989 | Hirota et al. | 65/308 |
| 4,883,528 | 11/1989 | Carpenter et al. | 65/275 |
| 5,378,255 | 1/1995 | Ito | 65/64 |

*Primary Examiner*—Donald E. Czaja
*Assistant Examiner*—Sean Vincent
*Attorney, Agent, or Firm*—Mark G. Bocchetti

[57] ABSTRACT

Optical glass preforms for use in subsequent molding processes for the production of lenses are produced which have a controlled peripheral edge wall geometry. Gobs of molten glass of predetermined weight and volume are dripped onto a lower mold surface. A pressing head including a sleeve and a plunger are lowered such that the sleeve surrounds the gob. The plunger is then depressed such that the upper mold surface of the plunger resides in a predetermined elevation above the lower mold surface thereby forcing the gob to conform to the cavity created within the sleeve and between the upper and lower mold surfaces. In such manner the sleeve serves as a form or exterior boundary for the resultant preform such that a preform is produced which requires no grinding or polishing prior to its use in subsequent molding operations.

17 Claims, 5 Drawing Sheets

METHOD AND APPARATUS FOR MAKING OPTICAL PREFORMS WITH CONTROLLED PERIPHERAL EDGE WALL GEOMETRY

BACKGROUND OF THE INVENTION

1. Field of the Invention

The present invention relates generally to the molding of optical glass lenses and, more particularly, to the manufacture of preform elements having a controlled peripheral edge wall geometry for use in the molding of optical glass lenses.

2. Brief Description of the Prior Art

Various methods and apparatus for the compression molding of glass optical elements are known in the prior art. With these methods and apparatus, optical element preforms sometimes referred to as gobs are compression molded at high temperatures to form glass lens elements. The basic process and apparatus for molding glass optical elements is taught in a series of patents assigned to Eastman Kodak Company. Such patents are U.S. Pat. No. 3,833,347 to Angle et al, U.S. Pat. No. 4,139,677 to Blair et al, and U.S. Pat. No. 4,168,961 to Blair. These patents disclose a variety of suitable materials for construction of mold inserts used to form the optical surfaces in the molded optical glass elements. Those suitable materials for the construction of the mold inserts included glasslike or vitreous carbon, silicon carbide, silicon nitride, and a mixture of silicon carbide and carbon. In the practice of the process described in such patents, a glass preform or gob is inserted into a mold cavity with the molds being formed out of one of the above mentioned materials. The molds reside within a chamber in which is maintained a non-oxidizing atmosphere during the molding process. The preform is then heat softened by increasing the temperature of the mold to thereby bring the preform up to about 100° C. above the Glass Transition Temperature ($T_g$) for the particular type of glass from which the preform had been made. Pressure is then applied by the mold to force the preform to conform to the shape of the mold. The mold and preform are then allowed to cool below the transition temperature of the glass. The pressure from the mold is then relieved. The temperature is lowered further and the finished molded lens is removed.

Because the molding of glass optical elements is done by compression rather than injection (as is utilized in plastic molding) a precursor metered amount of glass, generally referred to as a preform, is required. There are two fundamental shapes of preforms required which generally parallel the two fundamental finished lens shapes. For negative lenses, plano-plano preforms usually will be sufficient. These can be fabricated in high volume relatively inexpensively by grinding and polishing. For positive lenses, a ball (sphere) or ball-like lump of glass is needed. The basic constant when molding positive or negative lenses is that the molds must touch the softened glass at the center first and then press out to the edges to avoid wrinkles and voids in the finished lens element.

Plano-plano preforms for use in optical glass molding operations have been manufactured by pressing the molten glass gob to create a generally round disk. The problem with pressing molten glass to form a plano-plano preform has been that the generally circular disk is not truly circular because the peripheral edge wall was allowed to free form during pressing. Further, the peripheral edge wall of the disk has been generally rounded in cross section perpendicular to the cylindrical axis of the disk. Irregular peripheral edge wall geometry of the preform can result in difficulties in the insertion of the preform into the molding apparatus. These difficulties can lead to the preform being misaligned in the apparatus resulting in a non-usable molded lens element.

U.S. Pat. No. 3,293,017 and U.S. Pat. No. 3,271,126, both to Jenkins, teach a method and apparatus for forming small, thin and relatively uniform glass wafers or disks apparently for use in capacitors. The wafers are formed by dripping molten glass from an orifice in single drops or gobs onto a mold supported by a piston rod. The mold is then pneumatically driven to extend the piston rod such that the mold rises to press the drip of molten glass against a fixed plunger. A wire brush is employed to sweep the form to glass disks from the mold into a shoot.

Although plano-plano preforms can be made relatively inexpensively by grinding and polishing, the cost could be significantly reduced by pressing molten preforms to form disks having two opposing planar surfaces and a substantially cylindrical peripheral edge wall perpendicular to the two opposing planar surfaces. Forming glass preforms by pressing molten glass gobs to achieve a preform element having the desired peripheral edge wall geometry is heretofore unknown.

SUMMARY OF THE INVENTION

It is, therefor, an object of the present invention to provide a method and apparatus for pressing molten glass gobs to form plano-plano preforms with controlled peripheral edge wall geometry.

It is a further object of the present invention to provide a method for manufacturing plano-plano preforms for subsequent use in manufacturing molded optical glass elements wherein the preforms do not have to be ground and polished.

Still another object of the present invention is to provide a method and apparatus for manufacturing glass preforms having a shape which approximates the final shape of the finished glass element molded therefrom.

Briefly stated, these and numerous other features, objects and advantages of the present invention will become readily apparent upon a reading of the detailed description, claims and drawings set forth herein. These features, objects and advantages are accomplished by dripping gobs of molten glass of predetermined weight and volume onto a rotary table plate. The rotary table plate rotates the molten gob to a position under a pressing head which includes a seamless cylindrical sleeve with a plunger capable of reciprocating movement therein. The inside diameter of the sleeve is preferably the maximum diameter of what will ultimately be the finished lens. The pressing head is driven down against the top surface of rotary table. The plunger is set at a predetermined height within the sleeve to thereby set the thickness of the preform. In such manner, the sleeve simultaneously surrounds the gob as the plunger presses the gob to yield a plano-plano preform. Alternatively, the seamless cylindrical sleeve can descend first to achieve peripheral containment of the molten glass gob with the plunger then being actuated through operation of a cam to the correct thickness as it packs the glass gob into the temporary cavity formed on the rotary table within the sleeve. The variation in the volume of glass produced by the dropping mechanism is used to define the size and tolerances of the pressing head pieces so that no flashing occurs on the corners of the parts thus produced. After the molten gob is pressed to form the preform, the pressing head is raised from the table and the plunger is further actuated to eject the preform from the sleeve. The preform then falls back to the rotary table where it is rotated to another position for removal therefrom. In this manner, preforms, particularly plano-plano preforms, can be made without any grinding or polishing and without a free formed peripheral edge wall.

DETAILED DESCRIPTION OF THE PREFERRED EMBODIMENTS

Figure 1:
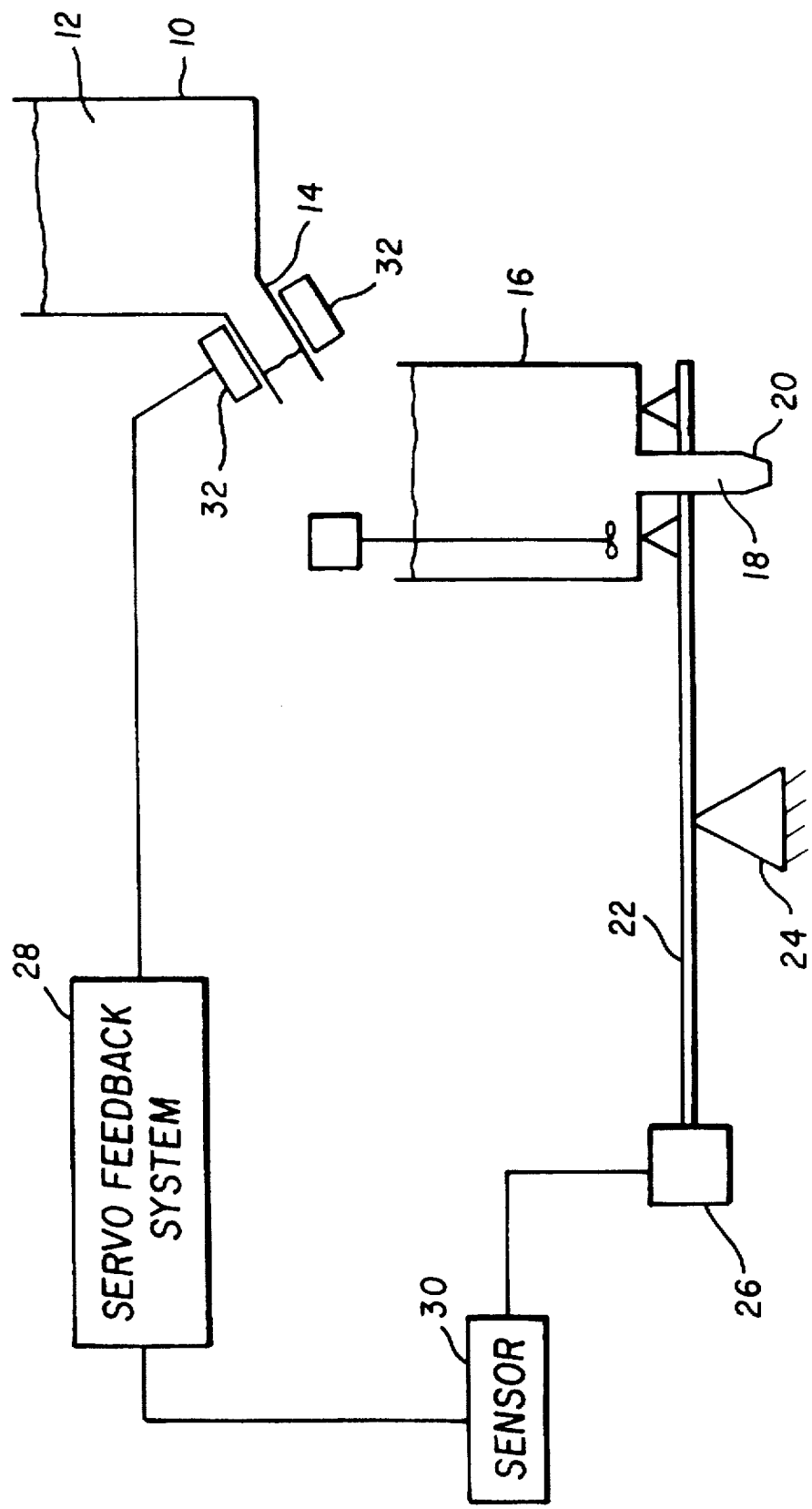
FIG. 1 is a schematic of an apparatus for producing gobs of molten glass of predetermined weight and volume.

Turning first to FIG. 1 there is shown a schematic of an apparatus for producing gobs of molten glass. That apparatus includes a reservoir crucible 10 which holds a supply of molten glass 12. Reservoir crucible 10 is provided with an outlet stem 14 which feeds molten glass from the reservoir crucible 10 to a working crucible 16. The working crucible 16 has a discharge nozzle 18 extending from the bottom thereof. The discharge nozzle 18 includes an frusto conical tip 20. The discharge nozzle 18 with its tip 20 are fabricated with a precise geometry in order to assist in defining a flow rate of molten glass therefrom. The working crucible 16 is supported on one end of a balance system including a beam 22 spanning a fulcrum 24. At the opposite end of beam 22 is a counterweight 26. As the weight of the working crucible 16 decreases, additional molten glass from the reservoir crucible 10 is delivered in a controlled manner to the working crucible 16. A servo feedback system 28 receives a signal from a sensor 30 sensing the position of counterweight 26. In such manner, as the working crucible 16 is depleted of molten glass, the servo feedback system 28, through sensor 30, detects the low mass of molten glass in the working crucible 16 and thereby produces a signal that regulates heat radiated from heater 32 positioned proximate to outlet stem 14. This temperature regulation of outlet stem 14 of the reservoir crucible 10 acts to meter the flow of molten glass 12 from the reservoir crucible 10 thereby replenishing molten glass to the working crucible 16. In this manner, the pressure head within working crucible 16 and, more particularly, at tip 20, is held relatively constant. Thus, the flow rate of molten glass through discharge nozzle 18 and tip 20 can be controlled to be substantially uniform over an extended period of time. This ensures that gob size is repeatable and, therefore, substantially uniform. For purposes of uniformity, it is beneficial to provide a supplemental heating device in close proximity to the discharge nozzle 18 and tip 20. For example, a flow rate of the order of one gram per second may be used to obtain a gob mass of approximately 1.5 grams. The working crucible 16 may be equipped with a stirring mechanism 34 in order to avoid the formation and entrainment of bubbles in the molten glass within working crucible 16.

Figure 2:
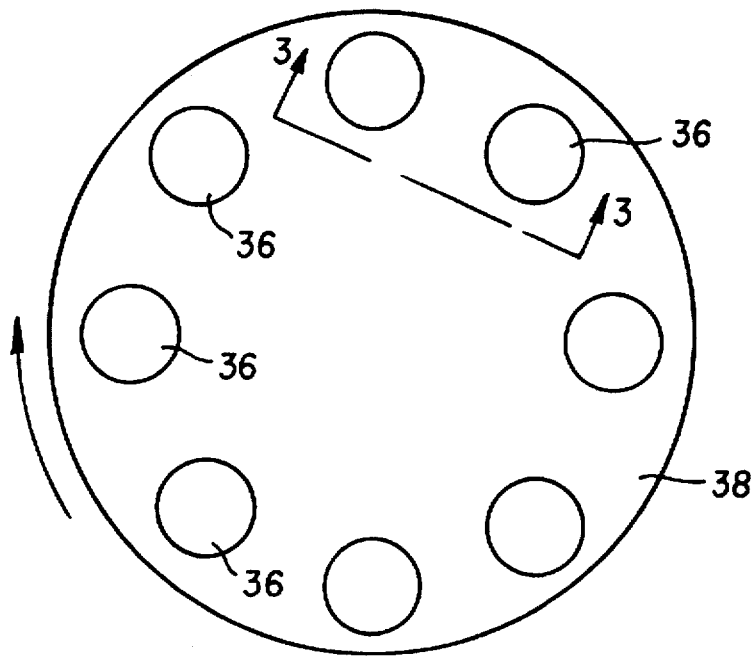
FIG. 2 is a top plan view of a rotary table apparatus which can be used in conjunction with the apparatus depicted in FIG. 1 to catch the gobs produced thereby.

Gobs are typically referred to as small gobs or large gobs. Usually, large gobs weigh one (1) gram and above. To make small gobs, the temperature controls on the tip 20 are set so that the molten glass drips to form drops or gobs of an appropriate and repeatable size. To make a large gob the tip geometry and the orifice size are adjusted or formed such that the molten glass flows rather than drips out of the orifice of the tip 20 and into one of a plurality of catching tools 36 located on a rotary table 38 (see FIGS. 2 and 3). The rotary table 38 is indexed to turn at a rate consistent with the flow rate of molten glass gobs dripping from tip 20 established for a given preform type (i.e., glass type and size). The individual catching tools 36 are cammed up or raised by a suitable lifting means to a position proximate to tip 20 for an appropriate dwell time to meter the proper size molten glass gob from tip 20 through the application of heat to discharge nozzle 18 and tip 20 by means of an external heater element (not shown). The catching tool 36 is then lowered sufficiently to pull off a separating tail without benefit of shears while the tail is still in the heating zone of tip 20. An additional heater (not shown) may be employed to ensure that the glass gob located on the catching tool 36 and its tail remain hot. In such manner, the tail heals into the surface of the molten glass gob while the gob and the tail are both hot and produces only a minimal mark, or no mark at all on the surface of the glass gob as the gob is cooled.

It is beneficial to preheat the catching tool 36 immediately prior to the delivery of a glass gob thereto from tip 20. Preheating the catching tools 36 help keep the glass gob from cooling down too quickly to minimize chill wrinkle and helps maintain the glass at a temperature above its softening point while the tail heals into the surface of the gob. The temperature of the catching tool should be elevated to at least 200° C. and preferably should be heated to a temperature in the range of from about 400° C. to about 750° C. A graphite catching tool 38 is preferred because graphite does not interact chemically with glass. However, since graphite burns at 500° C., a graphite catching tool should not be heated to above about 400° C. Materials other than graphite can be used for the manufacture of catching tools 36 so that such catching tools 36 can withstand higher temperatures. For example, catching tools manufactured from ceramic such as aluminosilicate can be used allowing such catching tools 36 to be heated to temperatures up to and exceeding 750° C.

The above-described method for the formation of gobs is particularly useful when forming large gobs where a tail is likely to form thereby creating a need to ensure that the tail is reintegrated with the gob with minimal surface defamation of the gob. The preferred method and apparatus for the formation of large gobs discussed briefly above is taught in greater detail in U.S. Pat. No. 5,709,723 which is hereby incorporated herein by reference. For the formation of small molten glass gobs, the method and apparatus taught in U.S. Pat. Nos. 3,271,126 and 3,293,017, both to Jenkins is preferred.

Figure 3:
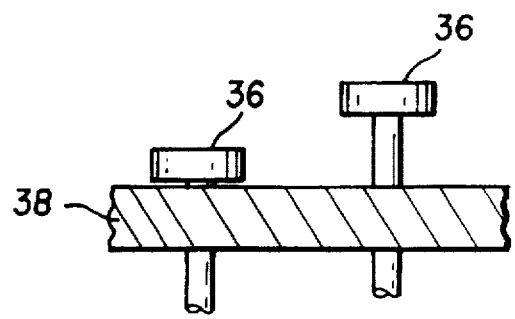
FIG. 3 is a partial sectional view taken along line 3—3 of FIG. 2.
Figure 4:
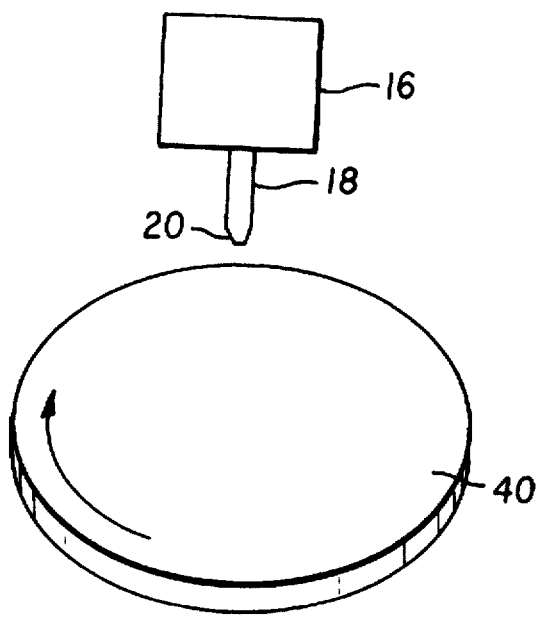
FIG. 4 is a perspective view of an alternative embodiment rotary table for catching gobs of molten glass produced by the apparatus of FIG. 1.
Figure 5:
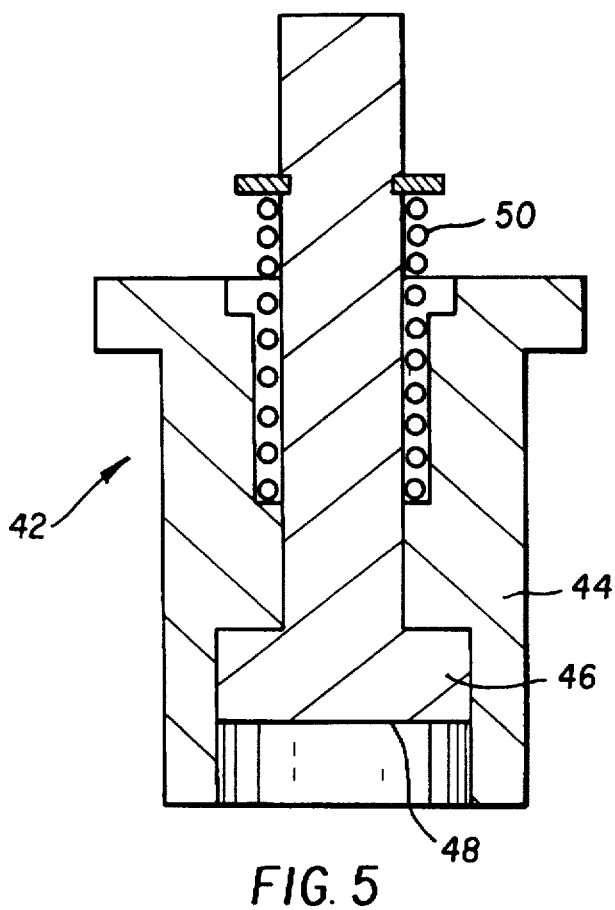
FIG. 5 is a side elevational/partial sectional view of the pressing head of the present invention positioned over the rotary table.

To make a small gob, the thermal controls on the tip 20 are set so that the appropriate size drop is created and repetitively reproduced in the manner described in the above-referenced Jenkins patents. These gobs are dropped and caught on a rotary table plate 40 (see FIG. 4) which does not include the individual catching tools 36 employed with rotary table 38 of FIG. 2. In the embodiment of FIG. 3, the support surface 39 of rotary table plate 40 serves as the lower mold surface for making plano-plano preforms, surface 39 is planar. The molten glass gobs are dropped and caught on the rotary table plate 40 with the rotation of rotary table plate 40 being sequenced under tip 20. The rotary table plate 40 is indexed at a turn rate consistent with the drop rate established for a given gob to be formed into a particular preform.

Figure 6:
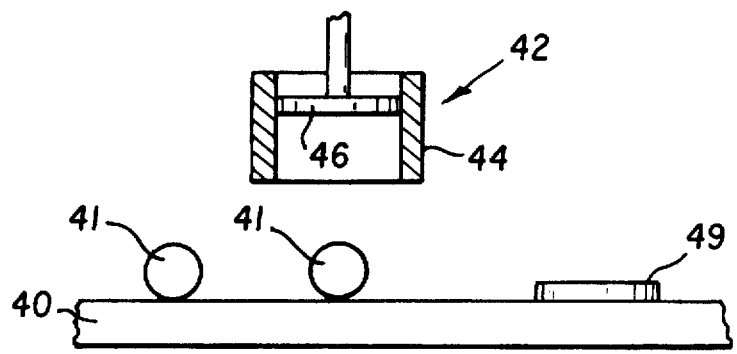
FIG. 6 is a side elevational/partial sectional view showing the pressing head of the present invention positioned over a glass gob on the rotary table.
Figure 7:
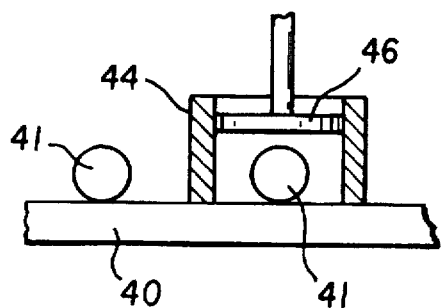
FIG. 7 is a side elevational/partial sectional view showing the pressing head of the present invention with the sleeve thereof lowered to meet the table and surround a glass gob.
Figure 8:
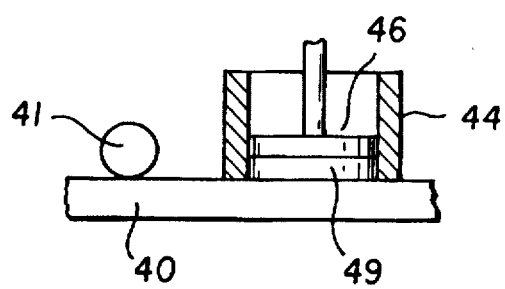
FIG. 8 is a side elevational/partial sectional view showing the plunger of the pressing head of the present invention in a depressed position thereby pressing the glass gob into a plano-plano preform.
Figure 9:
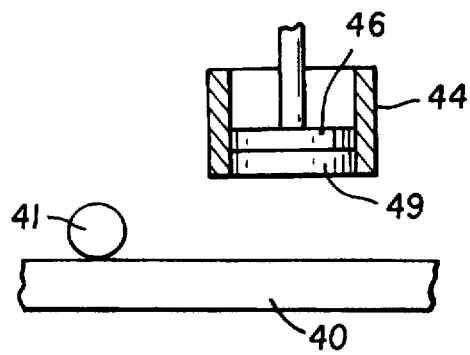
FIG. 9 is a side elevational/partial sectional view wherein the pressing head of the present invention has been raised from the rotary table with the preform still held within the sleeve.
Figure 10:
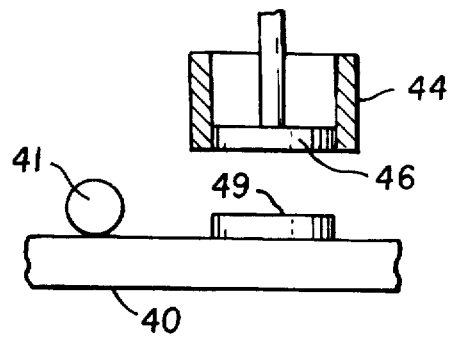
FIG. 10 is a side elevational/partial sectional view wherein the piston within the pressing head of the present invention has been depressed within the cylinder to eject the preform.

The rotary table plate 40 rotates each individual gob 41 to a position under a pressing head 42 (see FIGS. 6). Rotational movement of the rotary table plate 40 is halted for the actuation of the pressing head 42 when the newly dropped gob 41 of glass in indexed to move to the location under the pressing head 42, the sleeve or cylinder 44 of the pressing head 42 descends first to achieve peripheral containment of the glass gob 41 (see FIG. 7). A plunger or cylinder 46 of pressing head 42 is then actuated through a camming device or other means (not shown) to descend within sleeve 44 to a predetermined height above rotary table plate 40 (see FIG. 8). In this manner, the glass gob 41 is pressed to generally take the shape of the cavity formed between the planar mold surface 48 of plunger 46 and rotary table plate 40 within sleeve 44 to thereby become a preform 49. The variation and the volume of each glass gob 41 produced by the dropping mechanism described above is used to define the size and tolerances of the pressing head 42 so that no flashing occurs on the corner of sleeve 44 and plunger 46. After start up of both the gob formation apparatus and the pressing head 42, thermal equilibrium of the tools is quickly achieved and chill wrinkle of the glass gobs 41 is minimized. If chill wrinkle becomes a problem for a particular size of glass gob 41 or a particular type of glass used to form the gob 41, auxiliary heating of the pressing head 42 can be used. After the glass gob 41 has been pressed to generate a preform 49, the pressing head 42 is raised from table plate 40 with the preform 49 usually remaining within sleeve 44 (see FIG. 9). Plunger 46 is then further actuated to eject the finished preform 49 from sleeve 44 (see FIG. 10). The finished preform 49 is then free to continue on its cooling ride around rotary table 40 until it reaches an appropriate position for removal therefrom.

Figure 11:
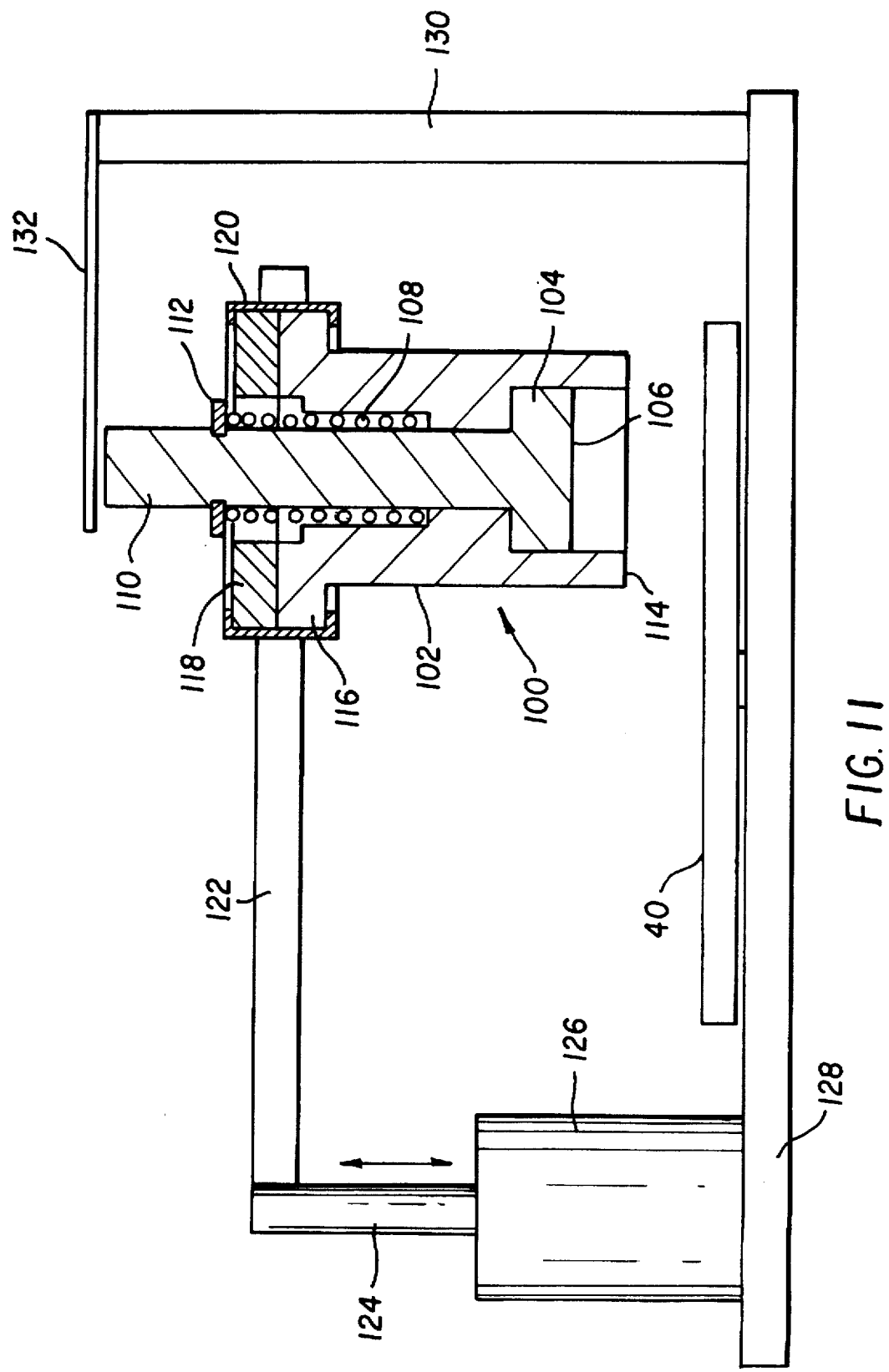
FIG. 11 is a side elevation of an alternative embodiment of the present invention with an alternative embodiment pressing head shown in cross section.

An alternative preferred embodiment pressing head 100 is depicted in FIG. 11. This pressing head 100 includes a sleeve 102 in which resides a plunger or piston 104 having a planar face 106. There is a compression spring 108 about the shaft 110 of piston 104 which is maintained in compression by means of clip 112 attached to shaft 110. Spring 108 thereby biases piston 104 to reside in a fully retracted position within sleeve 102. The distance from the planar surface 106 when piston 104 is in such fully retracted position to the annular bottom surface 114 of sleeve 102 is equal to the desired thickness of the preform to be pressed therewith. Sleeve 102 includes a flange 116 extending radially therefrom. Mounted to flange 116 is a spacer ring 118. There is a clamp 120 which encircles flange 116 and spacer ring 118. Attached to clamp 120 is arm 122 which supports pressing head 100. Arm 120 extends from a piston rod 124 driven by pneumatic cylinder 126. Pneumatic cylinder 126 is mounted to frame 128 which also supports rotary table 40. Projecting from frame 128 is post 130. Affixed to the top of post 130 is cantilevered member 132 which extends such that the distal end of cantilevered member 132 resides directly above the top of shaft 110.

In the operation of the pressing head 100, once the rotary table 40 has moved a gob into position, pneumatic cylinder 126 is actuated to drive pressing head 100 down against the top surface of rotary table 40. In such manner, the lower end of sleeve 102 simultaneously surrounds the gob as planar surface 106 presses the gob to yield a plano-plano preform. Pneumatic cylinder 126 then raises the pressing head 100 with the preform usually remaining within the pressing head 100. Pneumatic cylinder 126 raises the pressing head 100 further such that the top of shaft 110 is engaged by cantilevered member 132 thereby overcoming the bias of spring 108 and causing piston 104 move downwardly within sleeve 102. This downward movement of piston 104 ejects the preform from sleeve 102.

The geometry for a particular tip 20 of discharge nozzle 18 depends on a number of factors including the type of glass, the gob size, and the type of preform being made (ball, plano-plano, or large gob). For example, if a dense flint glass such as Hoya FDS-3 is being used to form large gob-type preforms over four (4) grams, it would be necessary that tip 20 would flow the molten glass therefrom at a greater distance without separation because of the depth of the mold cavity needed to accommodate the large preform. Usually, a frustro-conical type tip works best. On the other hand, if a ball preform is being made with a weight of about three hundred forty (340) milligrams from a high temperature crown glass such as Hoya TaC-4, the tip 20 would be designed so that a single drop of glass would form on the end of the tip 20 substantially equal to three hundred forty (340) milligrams before dropping into the catcher. The amount of glass that forms the preform is determined by the outside diameter of the tip 20, the material of the tip 20 is made from (100% Pt or Pt/Au), and the drop rate. With familiar glass types, tip size and geometry are based on previous experience. With particular types of glass not previously used in such a process, the data must be derived empirically through trial and error.

Figure 13:
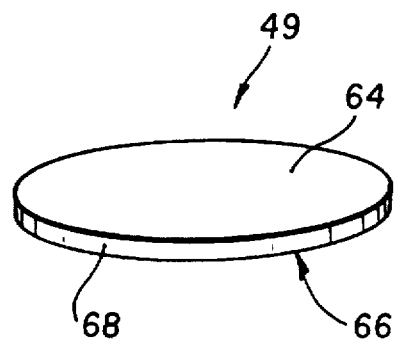
FIG. 13 is a perspective view of a plano-plano preform as produced by the present invention.
Figure 12:
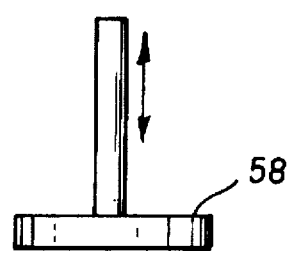
FIG. 12 is a side elevational/partial sectional view of an alternative embodiment of the present invention.
Figure 12:
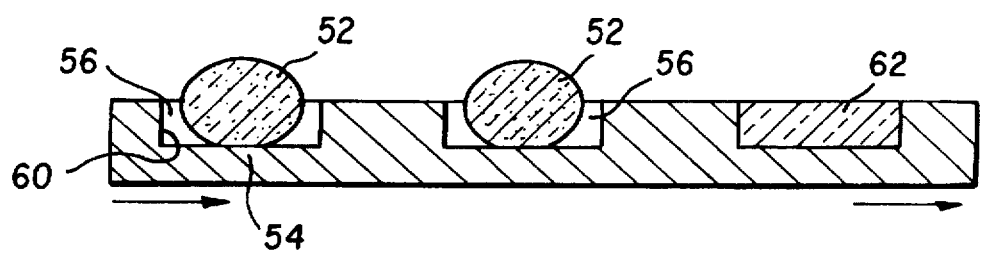

Looking next at FIG. 13, there is shown in schematic form another alternative embodiment of the present invention wherein the rotary table 54 (shown in cross section) is provided with a plurality of cylindrical recesses 56 in the surface thereof. The rotation of rotary table 54 is indexed such that each cylindrical recess 56 catches an individual gob 52 falling from tip 20. A pressing head 58 then moves downwardly to engage the top surface of the rotary table 54 thereby pressing down on the gob 52 and forcing it to conform to the shape of the cylindrical recess 56. In this manner, pressing head 58 does not need a sleeve such as that used in conjunction with the embodiment shown in FIGS. 1–11. Instead, cylindrical wall 60 of each cylindrical recess 56 serves to provide peripheral containment of gob 52 as it is pressed to thereby yield the controlled edge geometry of the preform 62. This alternative embodiment may be preferable to use in conjunction with a method for making large gobs. After partial cooling, the preforms can be removed from cylindrical recesses 56 by means of a vacuum pick-up (not shown).

By using the process of the present invention to make preforms, preforms 49 are manufactured without grinding or polishing and yet have a controlled peripheral edge wall geometry which joins the two optical surfaces. Thus, a piano-plano preform 49 (see FIG. 13) is made that includes a first generally planar surface 64, a second generally planar surface 66, and a generally cylindrical peripheral edge wall 58 which is perpendicular to the first and second planar surfaces 64, 66.

Although the present invention is described herein as being particularly useful in making plano-plano preforms, it should be recognized by those skilled in the art that the present invention can also be used to make preforms with shapes other than plano-plano. For example, it may be desirable to make preforms where one or both sides are convex. To accomplish this the rotary tables 38, 40 may be equipped with recesses which include a generally concave lower molding surface onto which the glass gobs 41 are dropped. In addition, the pressing surface of plunger 46 could be made to be generally concave in shape.

From the foregoing, it will be seen this invention is one well adapted to obtain all of the ends and objects hereinabove set forth together with other advantages which are apparent and which are inherent to the invention.

It will be understood that certain features and subcombinations are of utility and may be employed with reference to other features and subcombinations. This is contemplated by and is within the scope of the claims.

As many possible embodiments may be made of the present invention without departing from the scope thereof, it is to be understood that all matter herein set forth and shown in the accompanying drawings is to be interpreted as illustrative and not in the limiting sense.

What is claimed is:

1. A method for making a plano-plano optical element perform including a cylindrical edge wall, said method comprising the steps of:
   (a) producing a molten glass gob of predetermined weight and volume, and delivering the molten glass gob to a planar support surface;
   (b) surrounding the molten glass gob within a seamless cylindrical sleeve;
   (c) driving a piston to a predetermined position within the seamless cylindrical sleeve, the predetermined position of the piston creating a mold cavity within the seamless cylindrical sleeve having a volume not less than the volume of the molten glass gob, the piston including a planar contact surface parallel to the planar support surface, the planar contact surface engaging the molten glass gob thereby forming the plano-plano optical element preform.

2. A method for making an optical element preform including a cylindrical edge wall, said method comprising the steps of:
   (a) producing a molten glass gob of predetermined weight and volume, and delivering the molten glass gob to a lower mold surface;
   (b) surrounding the molten glass gob within a seamless cylindrical sleeve;
   (c) driving a piston including an upper mold surface to a predetermined position within the seamless cylindrical sleeve to thereby engage the molten glass gob, the predetermined position of the piston creating a mold cavity within the seamless cylindrical sleeve and between the upper and lower mold surfaces, the mold cavity having a volume not less than the volume of the molten glass gob thereby forming the optical element preform, the seamless cylindrical sleeve controlling the peripheral geometry of the optical element preform.

3. A method as recited in claim 2 wherein:
   said upper and lower mold surfaces are substantially planar.

4. A method as recited in claim 2 wherein:
   at least one of said upper and lower mold surfaces is concave.

5. A method as recited in claim 2 further comprising:
   heating the piston and the cylindrical sleeve.

6. A method for making an optical element preform including a cylindrical edge wall, said method comprising steps of:
   (a) producing a molten glass gob of predetermined weight and volume, and delivering the molten glass gob to a lower mold surface;
   (b) surrounding the molten glass gob within a single, seamless cylindrical wall means;
   (c) driving a piston including an upper mold surface to a predetermined position within the cylindrical wall means to thereby engage the molten glass gob, the predetermined position of the piston creating a mold cavity within the cylindrical wall means and between the upper and lower mold surfaces, the mold cavity having a volume not less than the volume of the molten glass gob thereby forming the optical element preform.

7. A method as recited in claim 6 wherein:
   the lower mold surface and the cylindrical wall means are integrally formed in a table plate.

8. An apparatus for making an optical element preform including a cylindrical edge wall, said apparatus comprising:
   (a) means for producing a molten glass gob of predetermined weight and volume;
   (b) means for delivering said molten glass gob to a lower mold surface;
   (c) a cylindrical cavity surrounding said molten glass gob on said lower mold surface, said cylindrical cavity including a single, seamless cylindrical wall;
   (d) a piston including an upper mold surface; and
   (e) means for moving said piston to a predetermined position within said cylindrical cavity thereby forming a mold cavity within said cylindrical cavity between said lower and upper mold surfaces, said mold cavity having a volume not less than the volume of the molten glass gob thereby forming the optical element preform.

9. An apparatus recited in claim 8 wherein:
   said lower and upper mold surfaces are planar.

10. An apparatus as recited in claim 8 wherein:
    at least one of said lower and upper mold surfaces is planar.

11. An apparatus as recited in claim 8 wherein:
    at least one of said lower and upper mold surfaces is convex.

12. An apparatus as recited in claim 8 wherein:
    said lower mold surface and said cylindrical cavity are integrally formed in a table plate.

13. An apparatus as recited in claim 8 wherein:
    said cylindrical cavity is integrally formed in a table plate.

14. An apparatus as recited in claim 8 wherein:

said lower mold surface is supported on a table plate.

15. An apparatus as recited in claim 14 wherein:

said cylindrical cavity is a mold head including a bottom edge and a cylindrical wall which is perpendicular to said bottom edge, said mold head being movable from a first position where said bottom edge is separated from said table plate by a predetermined distance to a second position where said bottom edge engages said table plate.

16. An apparatus as recited in claim 8 further comprising:
 (a) biasing means for biasing said piston to normally reside in a retracted position.

17. An apparatus as recited in claim 16 further comprising:
 (a) means for raising the cylindrical cavity away from said lower mold surface; and
 (b) means for driving said piston from said retracted position to an ejection position within said cylindrical cavity to thereby eject the optical element preform therefrom.

* * * * *